(12) United States Patent
Ohkawa et al.

(10) Patent No.: US 8,106,775 B2
(45) Date of Patent: Jan. 31, 2012

(54) CHECKOUT SYSTEM, CHECKOUT SYSTEM CONTROL PROGRAM, AND CHECKOUT SYSTEM CONTROL METHOD

(75) Inventors: Masanori Ohkawa, Inagi (JP); Mitsuo Watanabe, Inagi (JP); Shunji Shimada, Inagi (JP)

(73) Assignees: Fujitsu Frontech Limited, Inagi-shi (JP); Okuwa Co., Ltd., Wakayama-shi (JP)

( * ) Notice: Subject to any disclaimer, the term of this patent is extended or adjusted under 35 U.S.C. 154(b) by 602 days.

(21) Appl. No.: 12/065,973

(22) PCT Filed: Sep. 7, 2005

(86) PCT No.: PCT/JP2005/016452

§ 371 (c)(1),
(2), (4) Date: Mar. 9, 2009

(87) PCT Pub. No.: WO2007/029321

PCT Pub. Date: Mar. 15, 2007

(65) Prior Publication Data

US 2009/0219153 A1    Sep. 3, 2009

(51) Int. Cl.
*G08B 13/14* (2006.01)

(52) U.S. Cl. ............ 340/572.1; 340/10.1; 340/10.5

(58) Field of Classification Search ............ 340/572, 340/10, 505
See application file for complete search history.

(56) References Cited

U.S. PATENT DOCUMENTS

| 5,992,570 | A  | * | 11/1999 | Walter et al. ............ 186/36 |
| 6,837,428 | B2 | * | 1/2005  | Lee et al. ............ 235/383 |
| 7,168,525 | B1 | * | 1/2007  | Jacobs ............ 186/61 |
| 7,229,015 | B2 | * | 6/2007  | Persky ............ 235/383 |
| 7,565,952 | B2 | * | 7/2009  | Harris et al. ............ 186/66 |
| 2003/0001007 | A1 | * | 1/2003 | Lee et al. ............ 235/383 |
| 2004/0249717 | A1 | * | 12/2004 | Shirasaki ............ 705/17 |
| 2009/0283593 | A1 | * | 11/2009 | Masuda ............ 235/383 |

FOREIGN PATENT DOCUMENTS

| JP | 10-69574 A    | 3/1998 |
| JP | 2002-367030 A | 12/2002 |
| JP | 2005-526323 A | 9/2005 |
| WO | 03/098496 A2  | 11/2003 |

OTHER PUBLICATIONS

International Preliminary Report on Patentability (form PCT/IB/373) of International Application No. PCT/JP2005/016452 with form PCT/ISA/237.
International Search Report of PCT/JP2005/016452, date of mailing Dec. 13, 2005.

* cited by examiner

*Primary Examiner* — Travis Hunnings
(74) *Attorney, Agent, or Firm* — Westerman, Hattori, Daniels & Adrian, LLP

(57) ABSTRACT

A checkout system performs checkout of articles. The checkout system includes an LCD touch screen 11 for specifying a second article different from a first article having data on the article registered as first article data, a barcode scanner 12 for recognizing a presented article which is the first article presented, and a control unit 314 that determines whether the presented article specified as the second article by the LCD touch screen 11 is not the second article.

20 Claims, 18 Drawing Sheets

CHECKOUT SYSTEM, CHECKOUT SYSTEM CONTROL PROGRAM, AND CHECKOUT SYSTEM CONTROL METHOD

TECHNICAL FIELD

The present invention relates to a checkout system, a checkout system control program, and a checkout system control method for performing checkout of articles.

BACKGROUND ART

At the present day, a certain type of tag is attached to most articles in order to realize a checkout system for performing checkout of articles in a commercial marketplace. In particular, a barcode tag is widely used.

Checkout of an article (article with barcode) to which a barcode is attached is performed by reading out the barcode using a barcode scanner. On the other hand, checkout of an article (article without barcode) to which a barcode is not attached is performed by a user selecting article name, quantity, and the like displayed on a touch screen.

However, in a self-checkout system which allows a customer to execute a self-checkout, the abovementioned checkout method for performing checkout of an article without barcode may be abused in some cases. For example, improper operation of falsifying an expensive article with barcode, such as steak as a low-price article without barcode, such as banana is performed and, in this case, a shop side suffers a loss. In the following, two types of self-checkout systems will be described as a checkout system in which a countermeasure for such improper operation has been taken.

As a first self-checkout system, a self-checkout system provided with article measurement sections both at a portion near a barcode scanner and at an article bag station will be described. FIG. 18 is a block diagram showing an example of a configuration of a first conventional self-checkout system. The first self-checkout system includes a self-checkout (system) control unit 101, an article basket table 2, an article bag station 3, and an article database 6. The self-checkout system control unit 101 includes an LCD touch screen 11, a barcode scanner 12, a settlement section 13, a control section 114, a communication section 15, an article measurement section 21, and an article temporary-placing table 22. The article bag station 3 is provided with an article bag measurement section 4.

The article basket table 2 is a location where articles put in an article basket before checkout are placed. The article bag station 3 is a location where an article bag is hung with the mouth thereof opened. A customer puts articles after checkout in the article bag at the article bag station 3. The LCD touch screen 11 displays information to a user, as well as receives input operation from a user. The barcode scanner 12 irradiates an article with a laser scanning beam to thereby read out a barcode attached to the article. The settlement section 13 makes deposits and withdrawals of bills. The control section 114 controls respective sections provided in the self-checkout system. The control section 15 performs communication with the article database 6 or external terminal for shop assistant.

The article bag measurement section 4 measures the weight of an article bag containing articles at the article bag station 3. The article temporary-placing table 22 is a table for a user to temporarily place articles without barcode according to an instruction displayed on the LCD touch screen 11. The article measurement section 21 measures the weight of articles placed on the article temporary-placing table 22.

In the case where checkout of articles with barcode is performed, the control section 114 causes the barcode scanner 12 to read out a barcode attached to an article and acquires, from the article database 6, article information corresponding to the barcode information. The article information stored in the article database 6 includes weight of article in addition to article type, price, and the like. When a user puts the article in the article bag at the article bag station 3, the article bag measurement section 4 measures the weight of the entire article bag. Then, the control section 114 calculates an increase in the weight measured by the article bag measurement section 4 and compares a registration value of the weight of article acquired from the article database 6 and measurement value of the increase in the weight acquired from the article bag measurement section 4. When a difference between the two values falls within a predetermined range, the control section 114 performs registration of article sales data. When the difference exceeds a predetermined range, the control section 114 determines that improper operation is made.

In the case where checkout of articles without barcode is performed, a user selects an article without barcode on the LCD touch screen 11. Then, the control section 114 displays, on the LCD touch screen 11, an instruction for forcing the user to place the selected articles on the article temporary-placing table 22. When the user places the article on the article temporary-placing table 22, the article measurement section 21 measures the weight of the article. When the user puts the article in the article bag at the article bag station 3, the article bag measurement section 4 measures the weight of the entire article bag. Then, the control section 114 calculates an increase in the weight measured by the article bag measurement section 4 and compares a measurement value of the weight of article acquired from the article measurement section 21 and measurement value of the increase in the weight acquired from the article bag measurement section 4. When a difference between the two values falls within a predetermined range, the control section 114 performs registration of article sales data. When the difference exceeds a predetermined range, the control section 114 determines that improper operation is made.

Next, as a second self-checkout system, a self-checkout system provided with article measurement sections both at an article basket table and an article bag station will be described.

FIG. 19 is a block diagram showing an example of a configuration of a second conventional self-checkout system. In FIG. 19, the same reference numerals as those in FIG. 18 denote the same or corresponding parts as those in FIG. 18, and the descriptions thereof will be omitted here.

In FIG. 19, as compared with FIG. 18, a self-checkout system control unit 201 and an article database 206 are provided in place of the self-checkout system control unit 101 and article database 6, respectively. Further, as compared with the self-checkout system control unit 101, the self-checkout system control unit 201 includes a control section 214 in place of the control section 114, additionally includes an article basket measurement section 5, and does not require the article measurement section 21 and article temporary-placing table 22. The article basket table 2 includes the article basket measurement section 5.

The operation of performing checkout of an article with barcode is the same as that in the above first self-checkout system.

The article basket measurement section 5 measures the article basket containing articles which is placed thereon. When a user performs checkout operation of an article without barcode on the LCD touch screen 11 and puts the article in the article bag at the article bag station 3, the article bag measurement section 4 measures the weight of the entire article bag. Then, the control section 214 calculates an increase in the weight measured by the article bag measurement section 4, calculates a decrease in the weight measured by the article basket measurement section 5 and compares the decrease in the weight acquired from the article basket measurement section 5 and increase in the weight acquired from the article bag measurement section 4. When a difference between the two values falls within a predetermined range, the control section 214 performs registration of article sales data. When the difference exceeds the predetermined range, the control section 214 determines that improper operation is made.

There is known, e.g., the following Patent Document 1 as a conventional art related to the present invention. A self-scanning system apparatus disclosed in Patent Document 1 compares the weight of articles included in article information acquired by self-scanning operation and weight measured by measuring apparatuses provided on both the upstream and downstream sides of an article conveyer to thereby confirm the identity of each article.

Patent Document 1: Jpn. Pat. Appln. Laid-Open Publication No. 05-266322

DISCLOSURE OF THE INVENTION

Problems to be Solved by the Invention

As described above, the abovementioned self-checkout systems can prevent improper operation in which the weight of articles is changed before and after the checkout operation. However, in the case of checkout operation of articles without barcode, when a customer intentionally inputs, e.g., an expensive article (steak, DVD, etc.) different from an article (banana) that the customer declares (selects) as one that he or she wants to buy or when a customer inputs a plurality of articles at a time, a difference in the weight of articles between two points is not caused, allowing checkout to be made by improper operation.

The present invention has been made to solve the above problem, and an object thereof is to provide a checkout system, a checkout system control program, and a checkout system control method capable of preventing improper operation.

Means for Solving the Problems

To solve the above problem, according to the present invention, there is provided a checkout system for performing checkout of articles, comprising: a second article specification section that specifies a second article (e.g. expensive articles such as steak. DVD) different from a first article (e.g. reasonable articles such as banana) having data on the article registered as first article data; a recognition section that recognizes a presented article which is the first article presented; and a determination section that determines whether the presented article specified as the second article by the second article specification section is not the second article.

The checkout system according to the present invention comprises a first article data acquisition section that acquires first article data of the first article recognized by the recognition section, wherein the determination section uses the first article data acquired by the first article data acquisition section to determine that the presented article is not the second article.

In the checkout system according to the present invention, the first article data includes tag data of a tag attached to the first article, and the recognition section includes a tag reader for reading the tag data of the tag attached to the article presented.

In the checkout system according to the present invention, the first article data includes tag data of a tag attached to the first article, and the determination section includes a tag reader for reading the tag data of the tag attached to the article presented.

In the checkout system according to the present invention, the first article data includes the weight of the first article, and the determination section includes a weight measurement section that measures the weight of the article presented.

The checkout system according to the present invention comprises a second article data acquisition section that acquires second article data of the second article, wherein the determination section uses the second article data acquired by the second article data acquisition section to determine that the presented article is not the second article.

In the checkout system according to the present invention, the second article data includes a parameter concerning the size of an article, and the determination section includes a size parameter detection section that detects the parameter concerning the size of the article presented.

In the checkout system according to the present invention, the second article data includes the shape of an article, and the determination section includes a shape detection section that detects the shape of the article presented.

In the checkout system according to the present invention, in the case where it is determined by the determination section that the article represented is not the second article, the operation state is set back to the state before an article is specified as the second article by the second article specification section.

The checkout system according to the present invention comprises an alarm notification section that issues an alarm notification in the case where it is determined by the determination section that the article represented is not the second articles.

According to the present invention, there is provided a checkout system control program allowing a computer to execute a checkout system control method that performs checkout of articles, the program allowing the computer to execute: a second article specification step that specifies a second article different from a first article having data on the article registered as first article data; a recognition step that recognizes a presented article which is the first article presented; and a determination step that determines whether the presented article specified as the second article by the second article specification step is not the second article.

The checkout system control program according to the present invention allows the computer to execute, between the recognition step and determination step, a first article data acquisition step that acquires first article data of the first article recognized by the recognition step, wherein the determination step uses the first article data acquired by the first article data acquisition step to determine that the presented article is not the second article.

In the checkout system control program according to the present invention, the first article data includes tag data of a tag attached to the first article, and the recognition step includes reading the tag data of the tag attached to the article presented.

In the checkout system control program according to the present invention, the first article data includes tag data of a tag attached to the first article, and the recognition step includes reading the tag data of the tag attached to the article presented.

In the checkout system control program according to the present invention, the first article data includes the weight of the first article, and the recognition step includes measuring the weight of the article presented.

The checkout system control program according to the present invention allows the computer to execute, between the recognition step and determination step, a second article data acquisition step that acquires second article data of the second article, wherein the determination step uses the second article data acquired by the second article data acquisition step to determine that the presented article is not the second article.

The checkout system control program according to the present invention allows the computer to execute, after the determination step, an alarm notification step that issues an alarm notification in the case where it is determined by the determination step that the article presented is not the second article.

According to the present invention, there is provided a checkout system control method that performs checkout of articles, comprising: a second article specification step that specifies a second article different from a first article having data on the article registered as first article data; a recognition step that recognizes a presented article which is the first article presented; and a determination step that determines whether the presented article specified as the second article by the second article specification step is not the second article.

BEST MODE FOR CARRYING OUT THE INVENTION

Now, embodiments of the present invention will be described in greater detail by referring to the accompanying drawings.

First Embodiment

A self-checkout system which is an example of a checkout system will be described below. The self-checkout system in the present embodiment uses a barcode scanner in order to detect an improperly specified article.

First, a configuration of the self-checkout system according to the present embodiment will be described.

Figure 1:
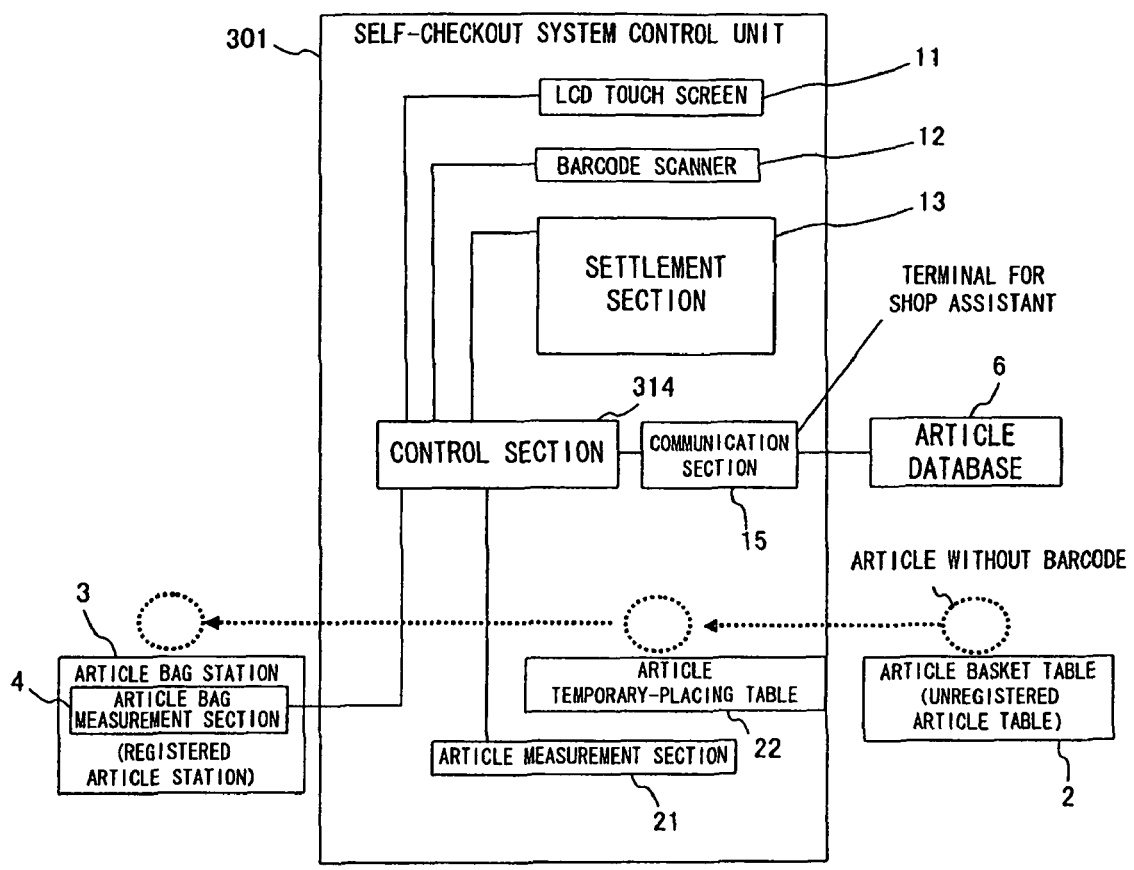
FIG. 1 is a block diagram showing an example of a configuration of a self-checkout system according to a first embodiment.
Figure 18:
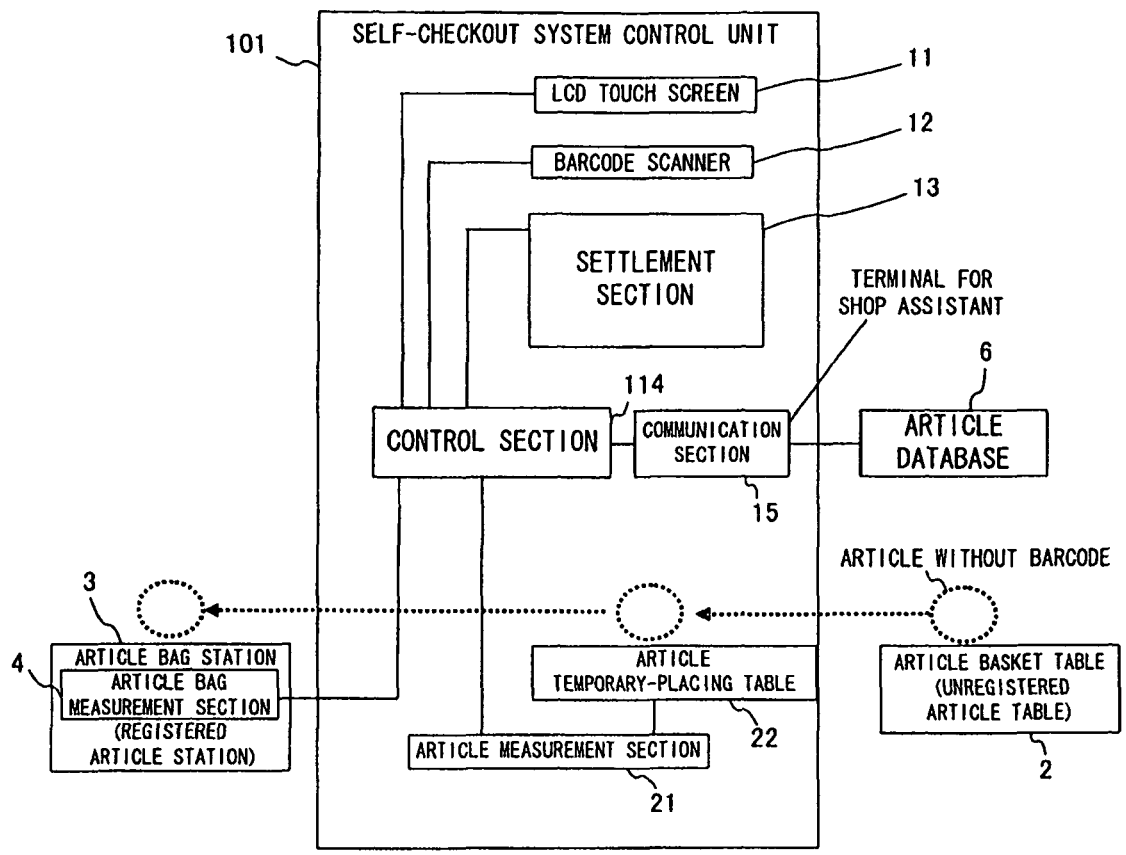
FIG. 18 is a block diagram showing an example of a configuration of a first conventional self-checkout system.
Figure 19:
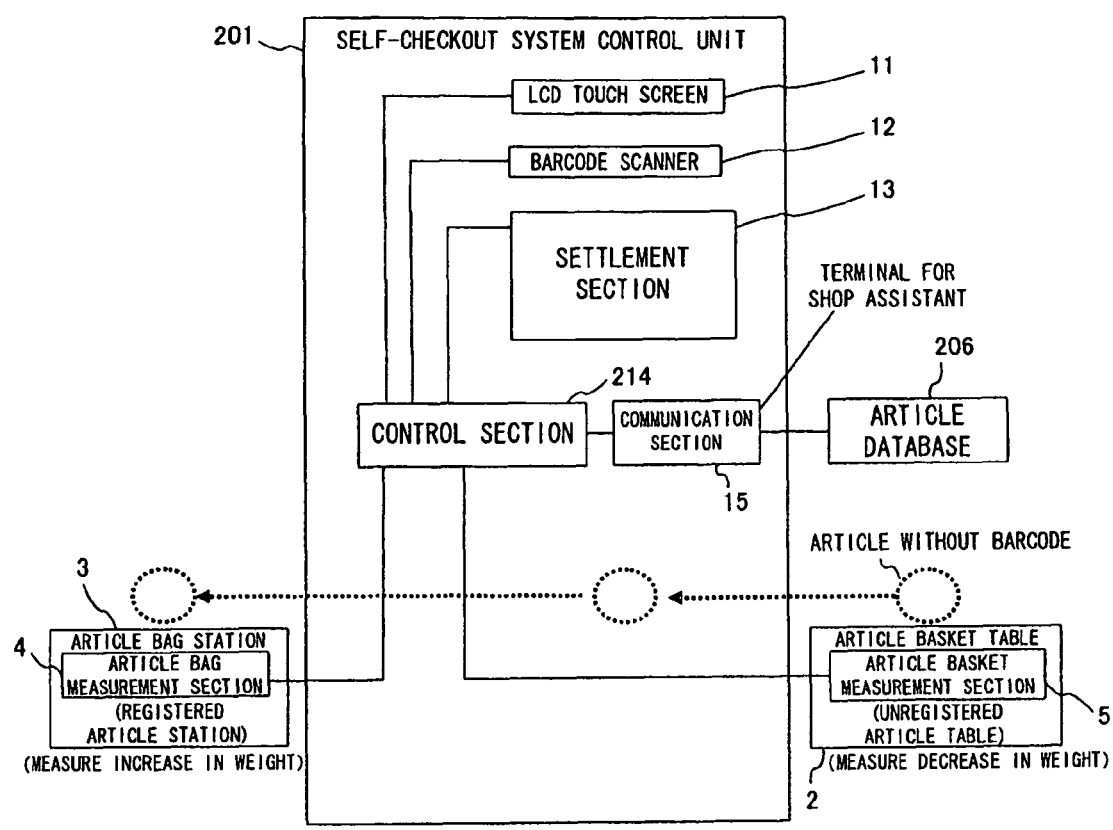
FIG. 19 is a block diagram showing an example of a configuration of a second conventional self-checkout system.

FIG. 1 is a block diagram showing an example of a configuration of the self-checkout system according to a first embodiment. In FIG. 1, the same reference numerals as those in FIG. 18 denote the same or corresponding parts as those in FIG. 18, and the descriptions thereof will be omitted here. In FIG. 1, as compared with FIG. 18, a self-checkout system control unit 301 is provided in place of the self-checkout system control unit 101. Further, as compared with the self-checkout system control unit 101, the self-checkout system control unit 301 includes a control section 314 in place of the control section 114.

Next, operation of the self-checkout system according to the present embodiment will be described.

Figure 2:
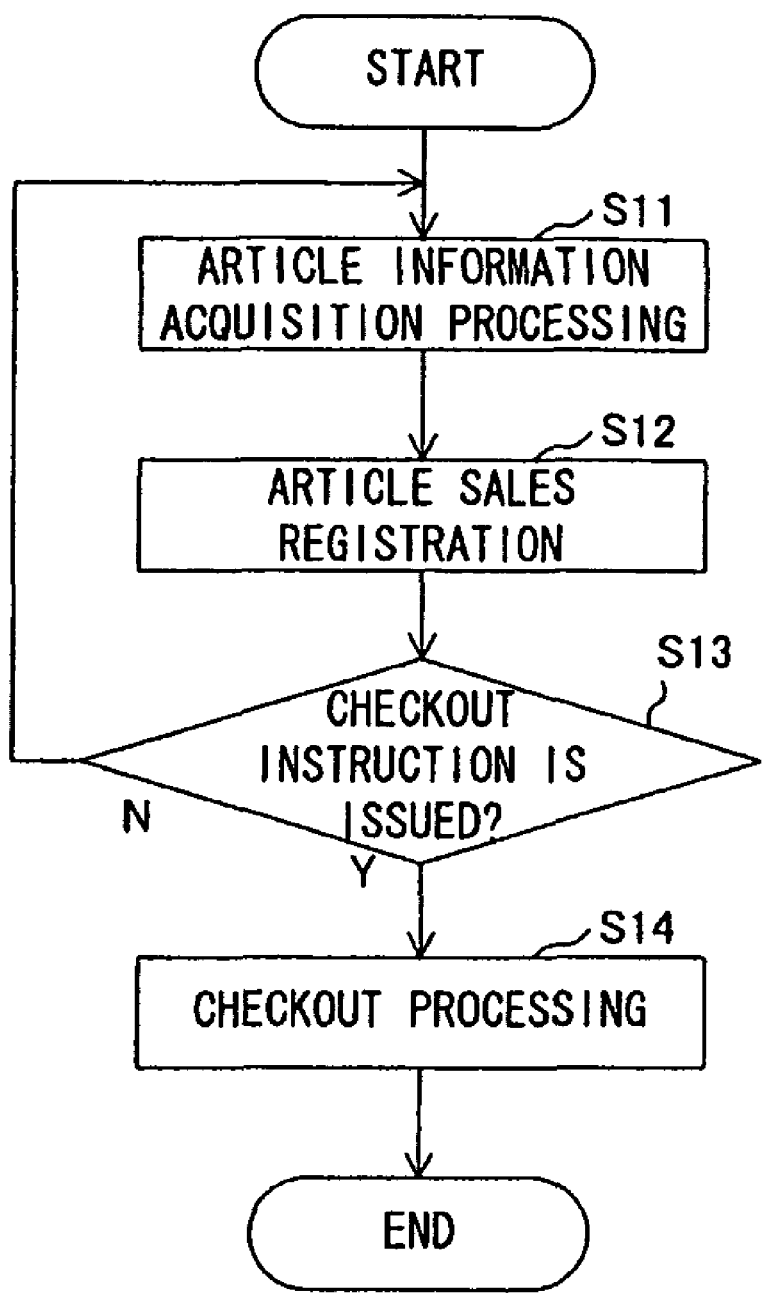
FIG. 2 is a flowchart showing an example of operation of the self-checkout system according to the present invention.

FIG. 2 is a flowchart showing an example of operation of the self-checkout system according to the present invention. First, in response to customer's operation, the control section 314 acquires article information of each article (S11). The details of the article information acquisition processing will be described later. The control section 314 performs registration of sales data of the articles whose article information have been acquired (S12). Subsequently, the control section 314 determines whether there is issued a checkout instruction on the LCD touch screen 11 (S13). When there has not been issued a checkout instruction (N in S13), the flow returns to step S11. On the other hand, when there has been issued a checkout instruction (Y in S13), the control section 314 performs checkout processing.

Next, operation of the article information acquisition processing will be described.

Figure 3:
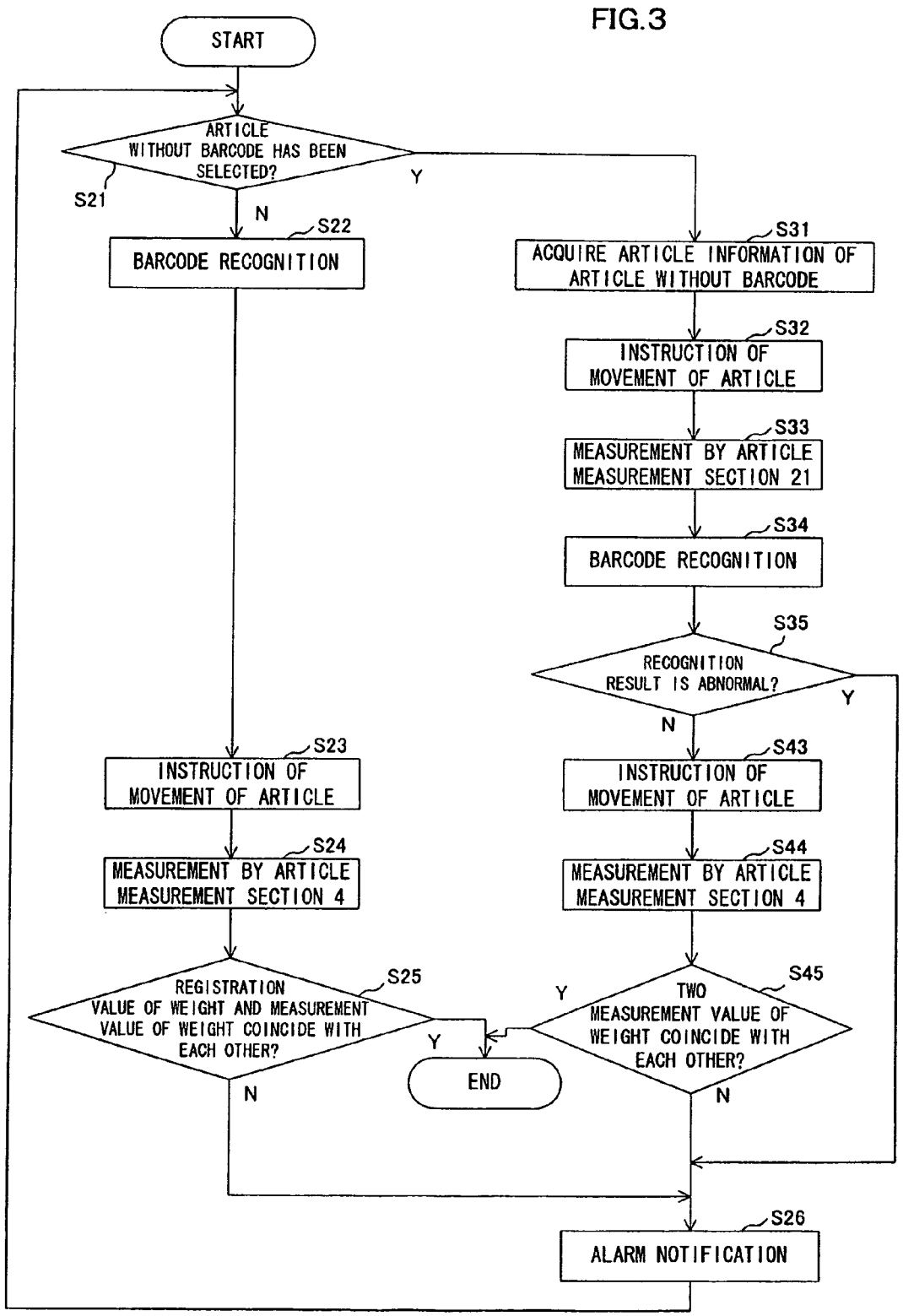
FIG. 3 is a flowchart showing an example of article information acquisition processing performed in the self-checkout system according to the first embodiment.

FIG. 3 is a flowchart showing an example of article information acquisition processing performed in the self-checkout system according to the first embodiment. The control section 314 displays a barcode scan instruction screen on the LCD touch screen 11 and then determines whether a user has selected an article without barcode on the barcode scan instruction screen (S21).

Figure 4:
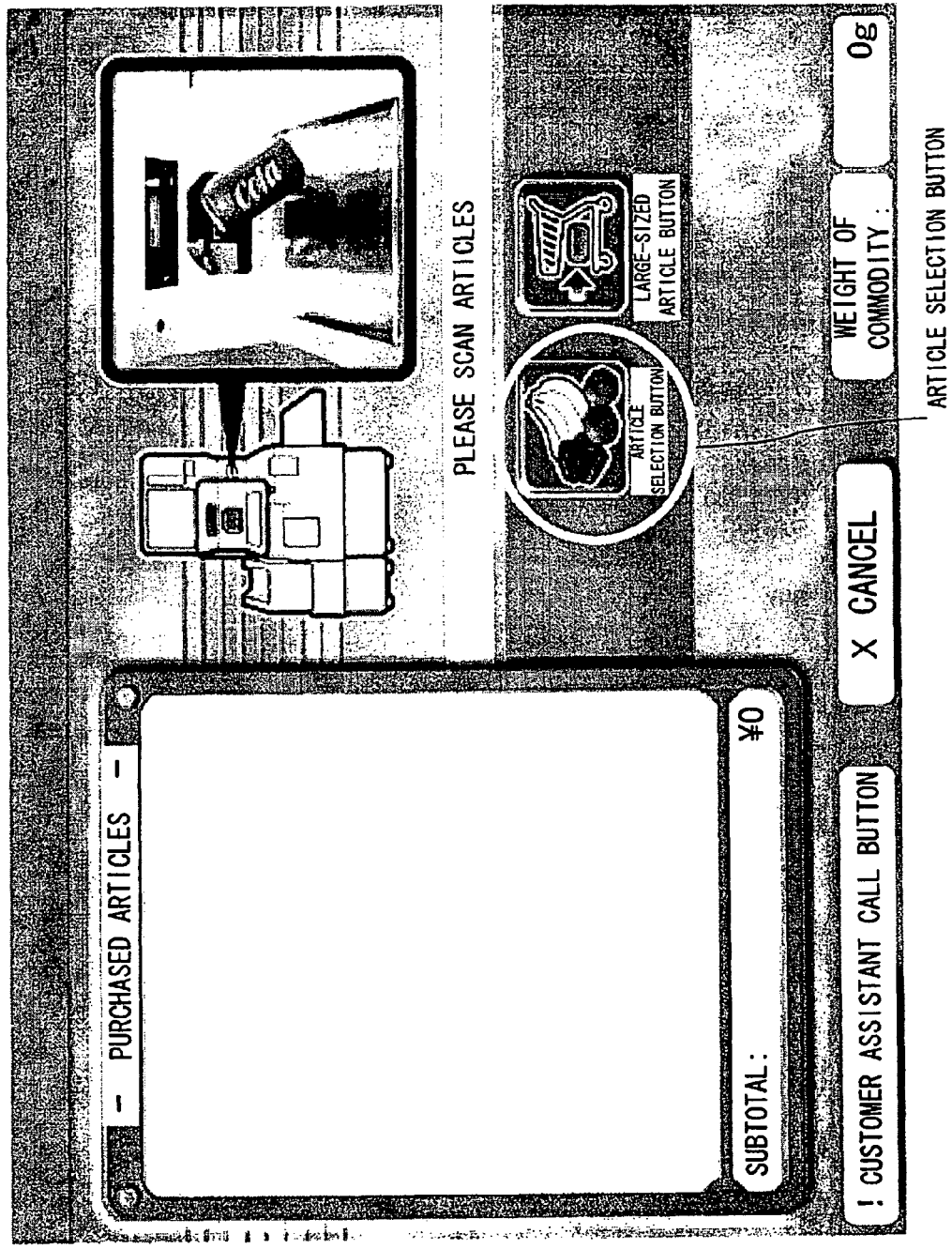
FIG. 4 is a view showing an example of a barcode scan instruction screen in the self-checkout system according to the present invention.

FIG. 4 is a view showing an example of the barcode scan instruction screen in the self-checkout system according to the present invention. In the case of an article with barcode, a user performs scanning of the barcode according to the guidance on the screen. On the other hand, in the case of an article without barcode, a user presses an article selection button on the screen so as to input article information of the article without barcode.

When a user has not selected an article without barcode (N in S21), the control section 314 causes the barcode scanner 12 to read out the barcode attached to the article and acquires, from the article database 6, article information corresponding to the barcode (S22). After the readout operation, the control section 314 displays, on the LCD touch screen 11, a bagging instruction screen for instructing a user to put the article in the bag hung at the article bag station 3 (S23).

Then, the control section 314 causes the article bag measurement section 4 to measure the entire article bag and calculates an increase in the weight as a measurement value of the article weight (S24). The control section 314 then compares a registration value of the article weight acquired from the article database 6 and measurement value of the article weight acquired from the article bag measurement section 4 to determine that the registration value and measurement value coincide with each other (S25). "Coincide" in this case means that a difference between the above two values falls within a predetermined range. When the two values coincide with each other (Y in S25), this flow is ended. On the other hand, when the two values do not coincide with each other (N in S25), the control section 314 displays alarm notification on the LCD touch screen 11 (S26), and the flow returns to step S21.

In the above notification operation, the control section 314 may display not only an alarm but also the content instructing a user to perform the operation once again. Further, in the notification operation, the control section 314 may display the above information not only on the LCD touch screen 11 but also on an external terminal for shop assistant through the communication section 15.

On the other hand, when a user has selected an article without barcode (Y in S21), the control section 314 acquires article information of the selected article without barcode based on the user's input operation on the LCD touch screen 11 (S31). Here, the input operation of article information of the article without barcode will be described. When an article selection button displayed on the above-mentioned barcode scan instruction screen is depressed, the control section 314 displays an article category selection screen on the LCD touch screen 11.

Figure 5:
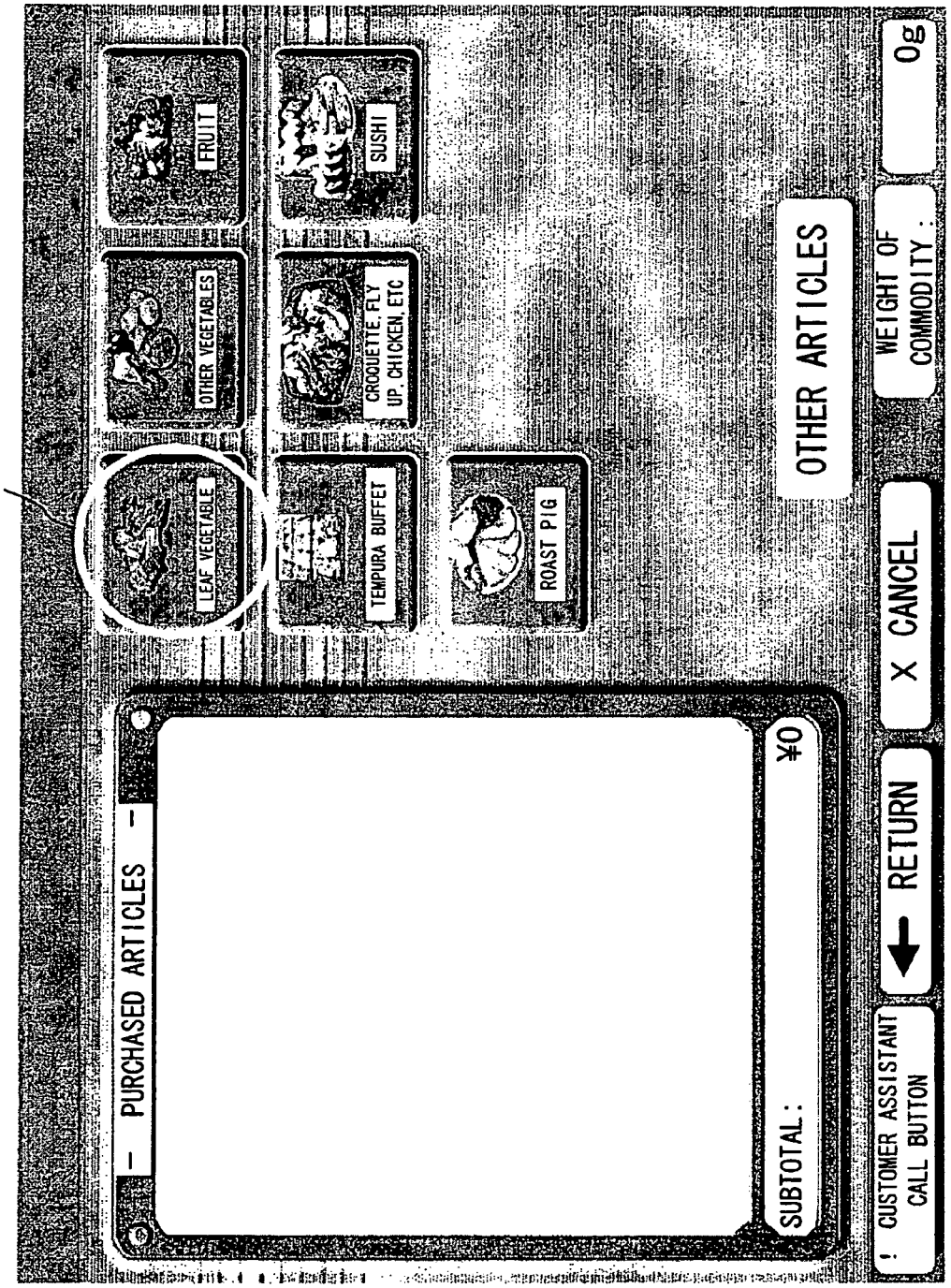
FIG. 5 is a view showing an example of an article category selection screen in the self-checkout system according to the present invention.

FIG. 5 is a view showing an example of the article category selection screen in the self-checkout system according to the present invention. A user selects the category of the article on this screen. In this example, a "vegetable" button has been selected. After the category of the article has been selected, the control section 314 displays an article type selection screen corresponding to the selected article category on the LCD touch screen 11.

Figure 6:
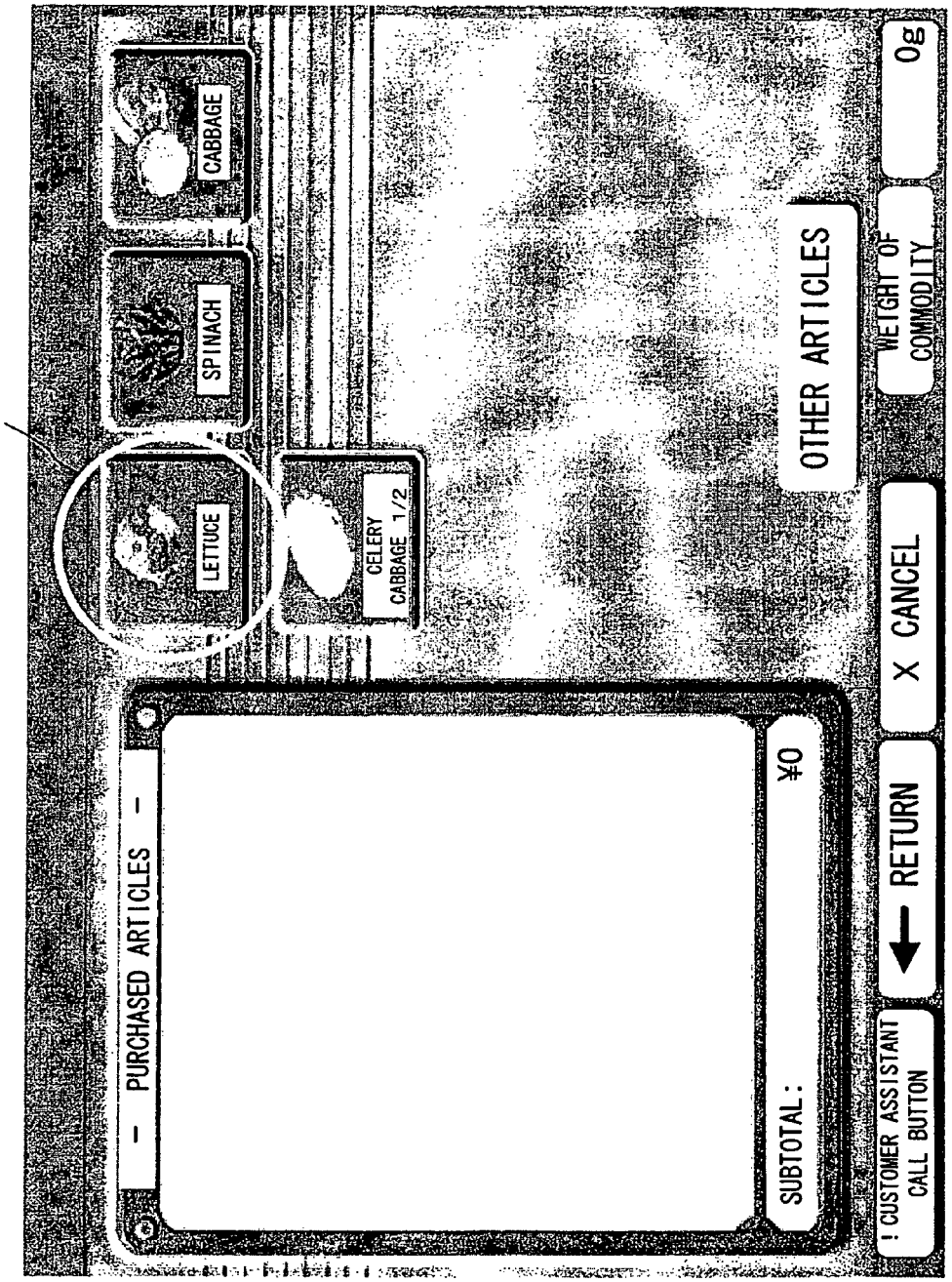
FIG. 6 is a view showing an example of an article type selection screen in the self-checkout system according to the present invention.

FIG. 6 is a view showing an example of the article type selection screen in the self-checkout system according to the present invention. A user selects the type of the article on this screen. In this example, a "lettuce" button has been selected. After the type of the article has been selected, the control section 314 displays a quantity input screen on the LCD touch screen 11.

Figure 7:
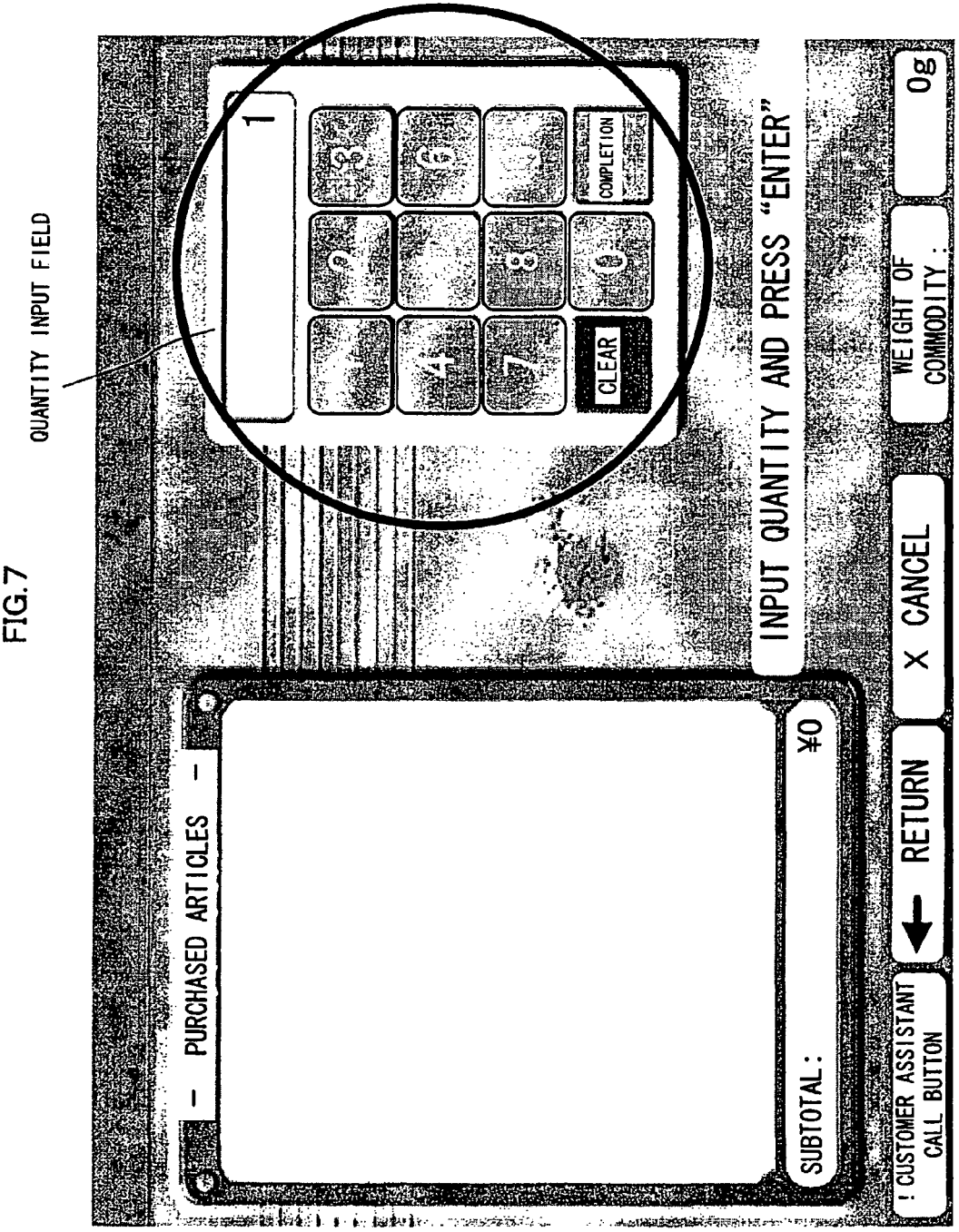
FIG. 7 is a view showing an example of a quantity input screen in the self-checkout system according to the present invention.

FIG. 7 is a view showing an example of the quantity input screen in the self-checkout system according to the present invention. A user selects the quantity of the article on this screen. In this example, "1" has been input on the quantity input screen.

Figure 8:
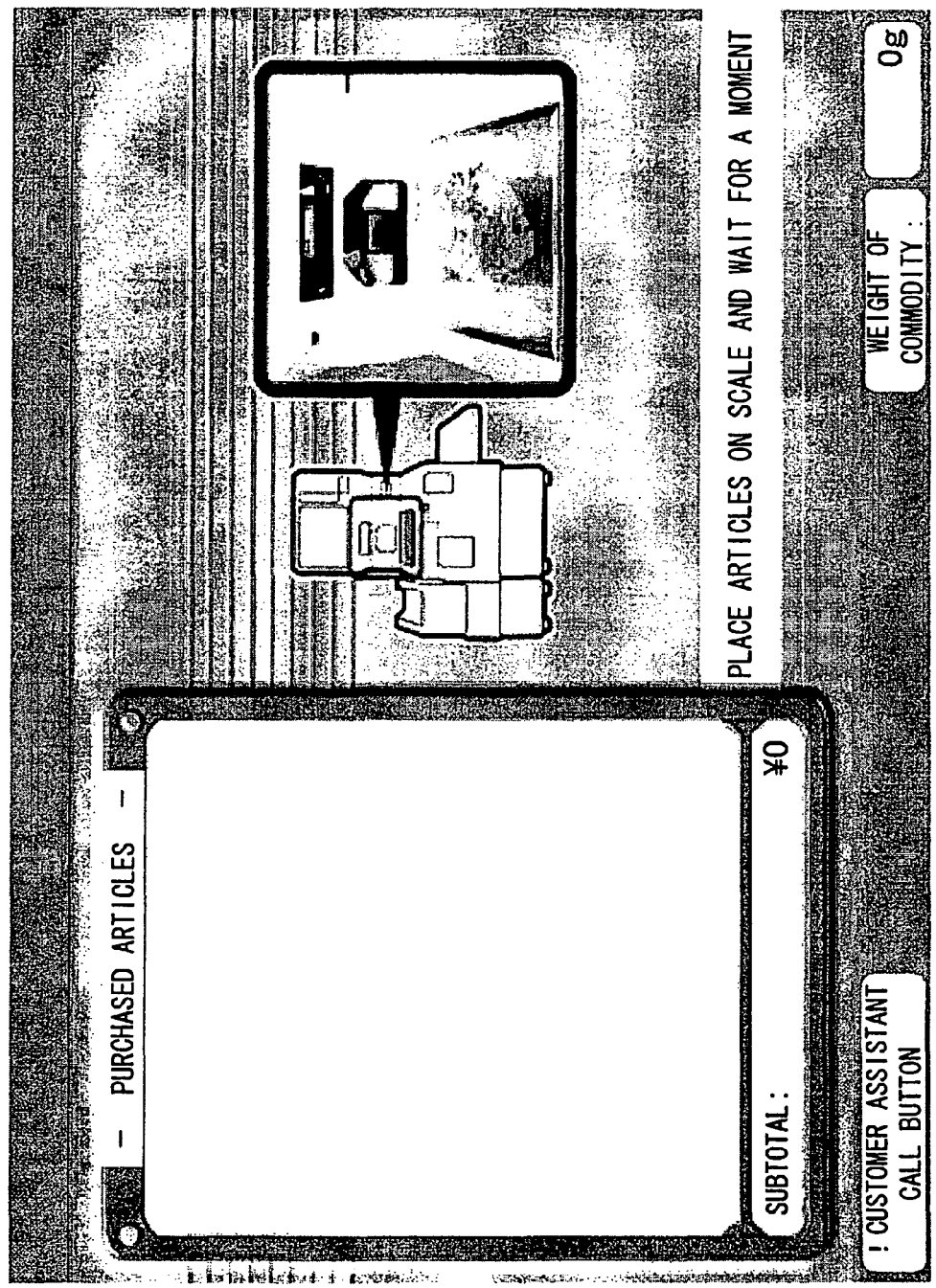
FIG. 8 is a view showing an example of a temporarily-placing instruction screen in the self-checkout system according to the present invention.

Then, the control section 314 displays, on the LCD touch screen 11, a temporarily-placing instruction screen for instructing a user to place the article on the article temporary-placing table 22 (S32). FIG. 8 is a view showing an example of the temporarily-placing instruction screen in the self-checkout system according to the present invention. The control section 314 then causes the article measurement section 21 to measure the weight of the article placed on the article temporary-placing table 22 (S33) and performs recognition operation of the barcode attached to the article, if possible (S34). That is, the control section 314 reads out the barcode of the article placed on the article temporary-placing table 22 with the barcode scanner 12 and acquires article information corresponding to the barcode from the article database 6.

Then, the control section 314 determines whether the recognition result is abnormal or not (S35). The case where the recognition result is abnormal means a case where a registration value of the weight that has been acquired from the article database 6 in response to the barcode recognition operation and measurement value of the weight acquired from the article measurement section 21 do not coincide with each other. In this case, since the user has specified the article as one without barcode, the control section 314 may determine that the recognition result is abnormal when the barcode recognition operation can be made.

Figure 9:
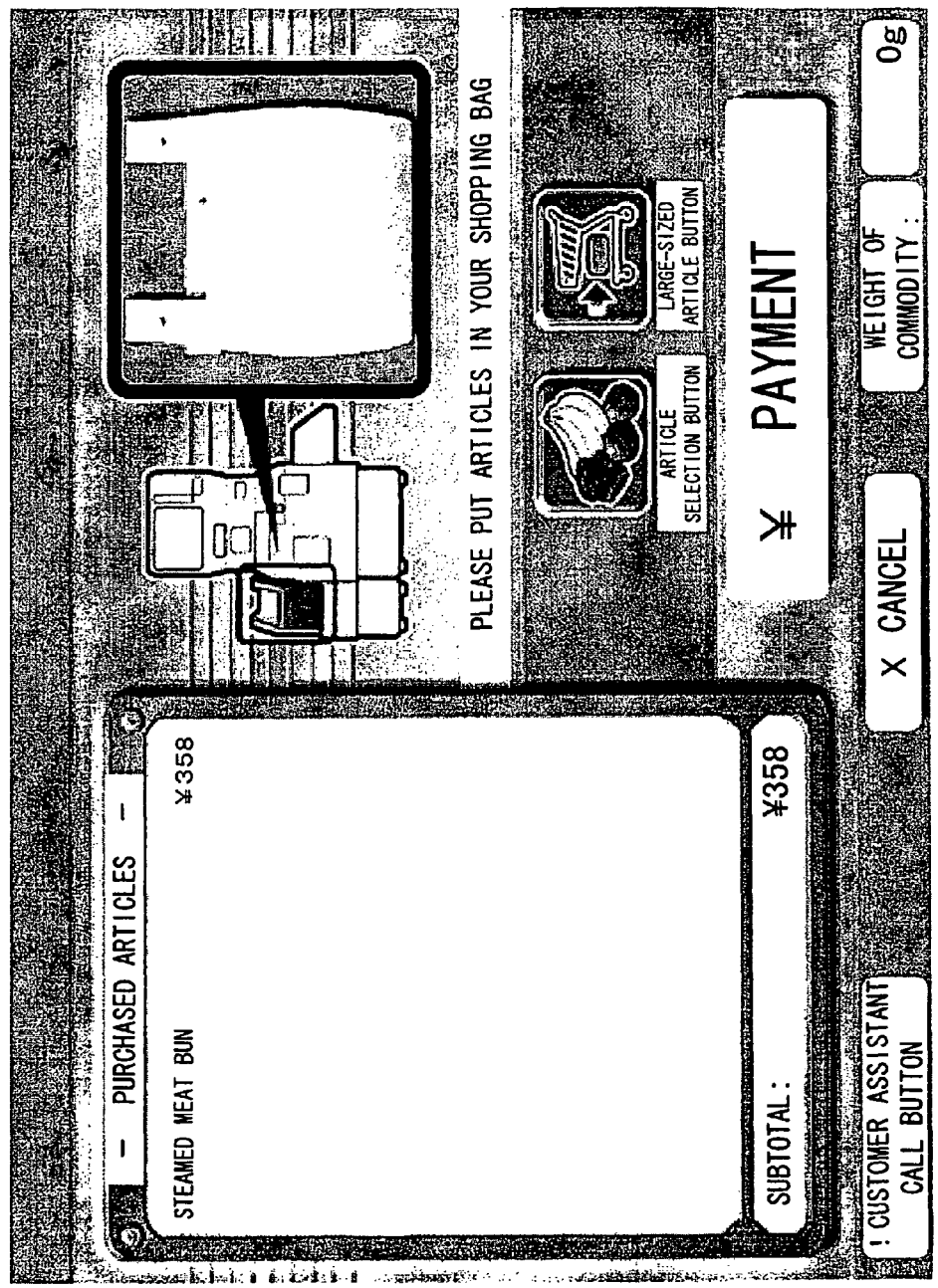
FIG. 9 is a view showing an example of a bagging instruction screen in the self-checkout system according to the present invention.

When the recognition result is abnormal (Y in S35), the flow shifts to step S26. On the other hand, when the recognition result is normal (N in S35), the control section 314 displays, on the LCD touch screen 11, a bagging instruction screen for instructing a user to put the article in the bag at the article bag station 3 (S43). FIG. 9 is a view showing an example of the bagging instruction screen in the self-checkout system according to the present invention. Then, the control section 314 causes the article bag measurement section 4 to measure the weight of the entire article bag and calculates an increase in the weight (S44). The control section 314 then compares the measurement value of the weight acquired from the article measurement section 21 and measurement value of the weight acquired from the article bag measurement section 4 and determines whether the two values coincide with each other (S45). "Coincide" in this case means that a difference between the above two values falls within a predetermined range.

When the two values do not coincide with each other (N in S45), the flow shifts to step S26. On the other hand, when the two values coincide with each other (Y in S45), this flow is ended.

Figure 10:
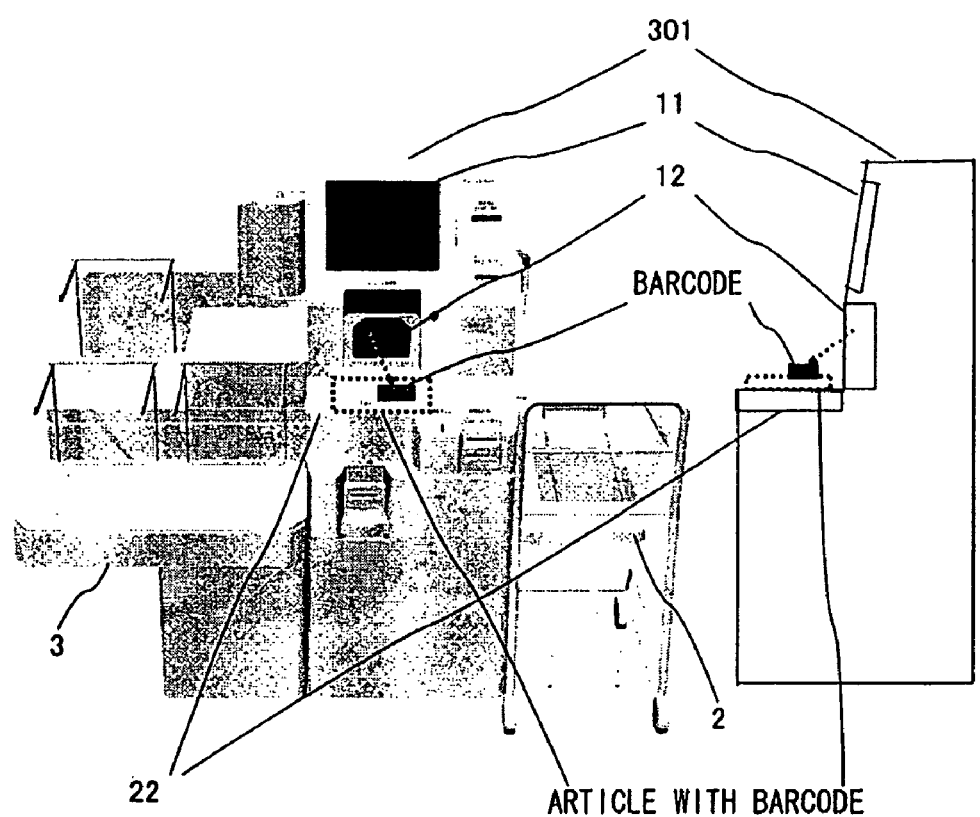
FIG. 10 is an outside view showing an example of the self-checkout system according to the first embodiment.

FIG. 10 is an outside view showing an example of the self-checkout system according to the first embodiment. FIG. 10 shows arrangement of the self-checkout system control unit 301 (including the LCD touch screen 11, barcode scanner 12, and article temporary-placing table 22), article basket table 2, and article bag station 3.

Further, FIG. 10 explains the operation of step S34. Even though a user specifies an article with barcode as an article without barcode, the barcode of the article with barcode is read out by the barcode scanner 12 at the time point when it is placed on the article temporary-placing table 22. That is, the barcode scanner 12 is caused to operate for all articles irrespective of whether the barcode is attached or not.

The angular range of the barcode scanner 12 within which a barcode can be read out may be made larger, or sensitivity thereof may be increased so as to increase the success rate of the barcode read operation for an article that has been specified as one without barcode.

Although the article database 6 is provided outside the self-checkout system control unit 301 and connected to the control unit 301 through the communication section 15 in the present embodiment, the article database 6 may be provided inside the self-checkout system control unit 301.

Further, although the self-checkout system has been described as an example of a checkout system, the present embodiment can be applied to a checkout system in which a shop assistant performs checkout operation.

According to the present embodiment, it is possible to prevent not only improper operation but also input error caused at the time of input of the article information of the article without barcode in the checkout system.

Further, according to the present embodiment, barcode read operation is performed even though a user specifies an article with barcode as an article without barcode in the checkout operation, thereby preventing the article with barcode from being regarded as one without barcode in the checkout operation.

Furthermore, according to the present embodiment, by representing respective portions such as the barcode scan instruction screen, temporarily-placing instruction screen, bagging instruction screen to a user together with the overall view of the self-checkout system, it is possible to reliably acquaint a user with an instruction for preventing improper operation.

Second Embodiment

In the present embodiment, a self-checkout system that uses a tag reader in order to detect an article that has falsely been specified by a user will be described.

First, a configuration of the self-checkout system according to the present embodiment will be described.

Figure 11:
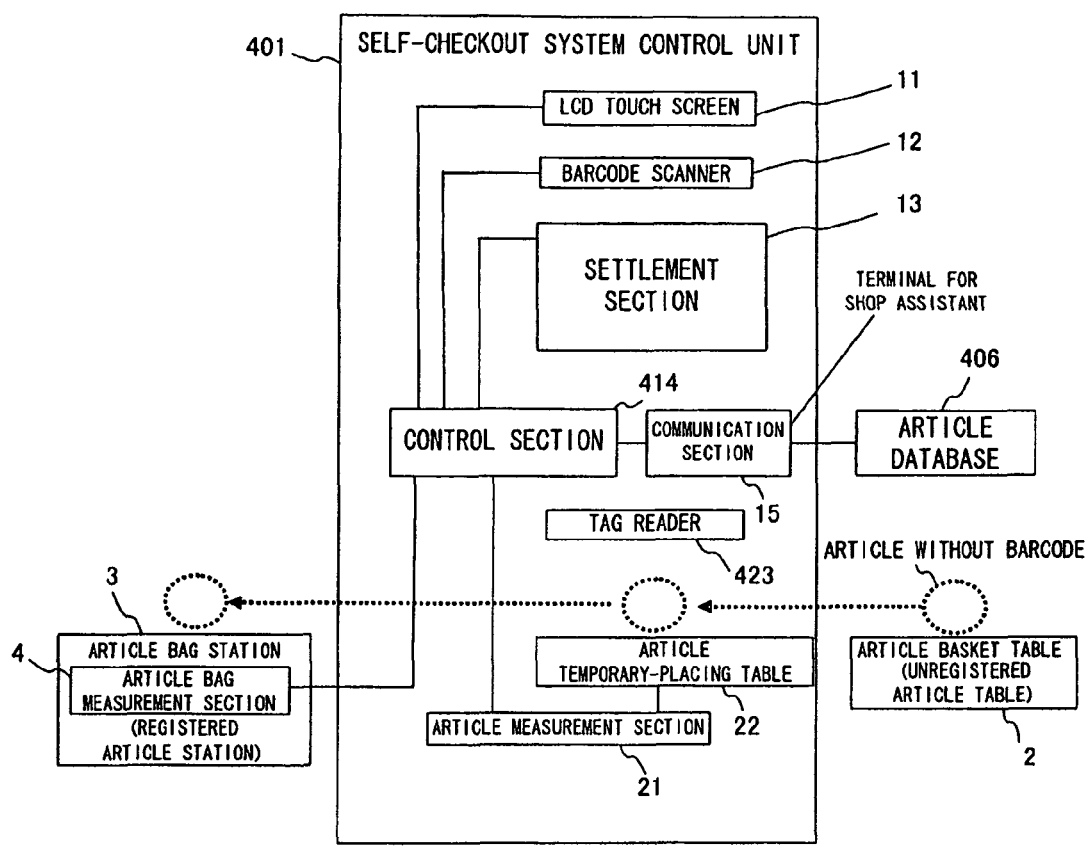
FIG. 11 is a block diagram showing an example of a configuration of a self-checkout system according to a second embodiment.

FIG. 11 is a block diagram showing an example of a configuration of the self-checkout system according to a second embodiment. In FIG. 11, the same reference numerals as those in FIG. 1 denote the same or corresponding parts as those in FIG. 1, and the descriptions thereof will be omitted here. In FIG. 11, as compared with FIG. 1, a self-checkout system control unit 401 and an article database 406 are provided in place of the self-checkout system control unit 301 and article database 6, respectively. Further, as compared with the self-checkout system control unit 301, the self-checkout system control unit 401 includes a control section 414 in place of the control section 314 and additionally includes a tag reader 423.

The tag reader 423 reads a tag attached to an article. The tag may be an EAS (Electronic Article Surveillance) tag, a magnetic tag, or an RF (Radio Frequency) ID tag. An EAS antenna, a magnetic tag reader, and an RFID reader correspond to the above tags, respectively. Such a tag is previously attached to a certain article such as an expensive article, and information corresponding to the tag is registered in the article database 406 independently of the article information registered in the article database 6.

Next, operation of the self-checkout system according to the present embodiment will be described.

Figure 12:
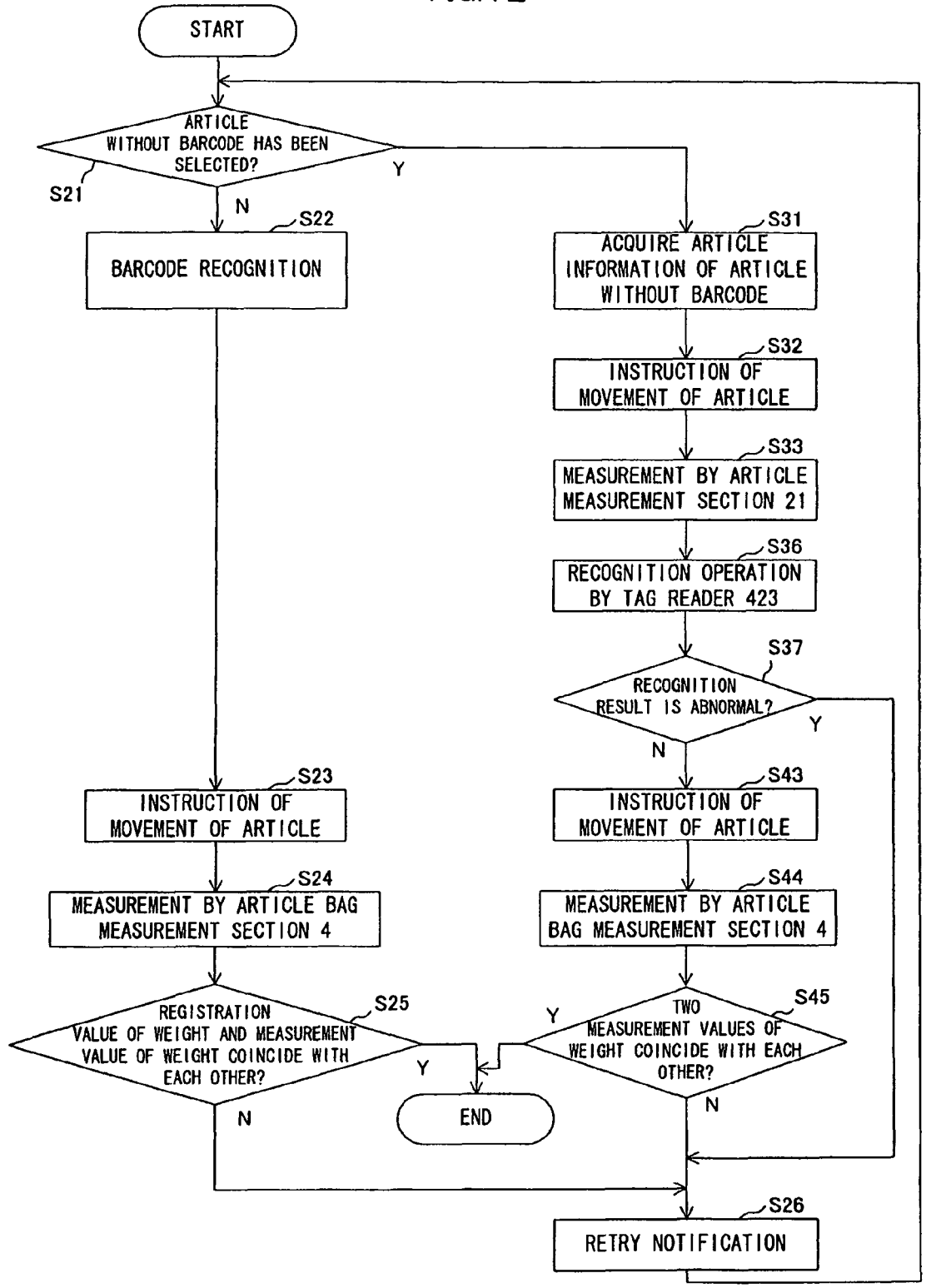
FIG. 12 is a flowchart showing an example of article information acquisition processing performed in the self-checkout system according to the second embodiment.

The operation of the self-checkout system according to the present embodiment is the same as that shown in FIG. 2 except for the article information acquisition processing. FIG. 12 is a flowchart showing an example of the article information acquisition processing performed in the self-checkout system according to the second embodiment. In FIG. 12, the same reference numerals as those in FIG. 3 denote the same or corresponding parts as those in FIG. 3, and the descriptions thereof will be omitted here. In FIG. 12, as compared with FIG. 3, step S36 is executed in place of step S34 and step S37 is executed in place of step S35.

After step S33, the control section 414 performs recognition operation using the tag reader 423, if possible (S36). That is, the control section 414 causes the tag reader 423 to read the tag of an article and acquires article information corresponding to the tag from the article database 406. Then, the control section 414 determines whether the recognition result is abnormal or not (S37). The case where the recognition result is abnormal means a case where a registration value of the weight that has been acquired from the article database 406 in response to the tag recognition operation and measurement value of the weight acquired from the article measurement section 21 do not coincide with each other. When the recognition result is abnormal (Y in S37), the flow shifts to step S26. On the other hand, when the recognition result is normal (N in S37), the flow advances to step S43.

Figure 13:
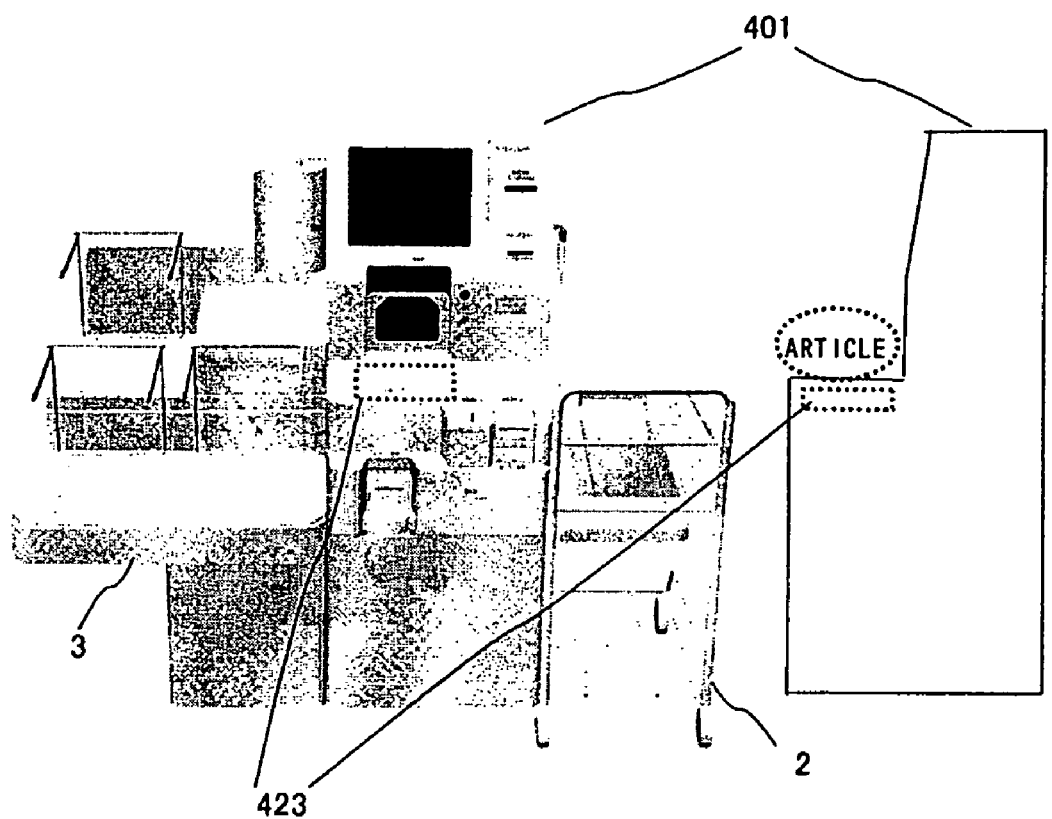
FIG. 13 is an outside view showing an example of the self-checkout system according to the second embodiment.

FIG. 13 is an outside view showing an example of the self-checkout system according to the second embodiment. FIG. 13 shows arrangement of the self-checkout system control unit 401 (including the tag reader 423), article basket table 2, and article bag station 3. The arrangement of the LCD touch screen 11, barcode scanner 12, and article temporary-placing table 22 is the same as that in FIG. 10. When a user performs checkout of an article without barcode, the tag of the article is read by the tag reader 423 at the time point when the article is placed on the article temporary-placing table 22.

Although the tag is attached to a certain article independently of the barcode in the present embodiment, the tag may be attached as a substitute for the barcode. This eliminates the need of providing the barcode scanner 12 in the self-checkout system.

According to the present embodiment, a use of the tag and tag reader allows article information to be acquired by simply bring the article close to the article temporary-placing table 22 irrespective of the posture thereof. As a result, it is possible to reduce the possibility of allowing checkout to be made by improper operation.

Third Embodiment

In the present embodiment, a self-checkout system that recognizes the feature of an article in order to detect an article that has falsely been specified by a user will be described.

First, a configuration of the self-checkout system according to the present embodiment will be described.

Figure 14:
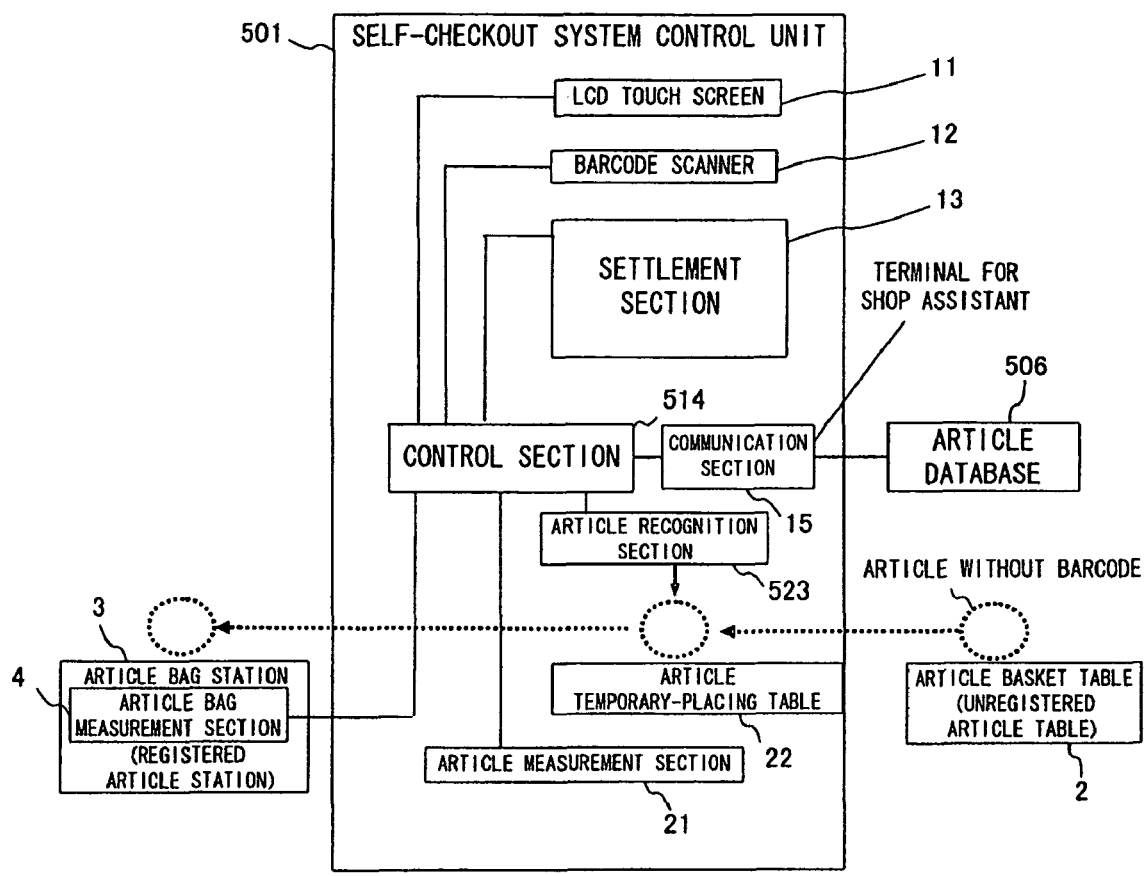
FIG. 14 is a block diagram showing an example of a configuration of a self-checkout system according to a third embodiment.

FIG. 14 is a block diagram showing an example of a configuration of the self-checkout system according to a third embodiment. In FIG. 14, the same reference numerals as those in FIG. 1 denote the same or corresponding parts as those in FIG. 1, and the descriptions thereof will be omitted here. In FIG. 14, as compared with FIG. 1, a self-checkout system control unit 501 and an article database 506 are provided in place of the self-checkout system control unit 301 and article database 6, respectively. Further, as compared with the self-checkout system control unit 301, the self-checkout system control unit 501 includes a control section 514 in place of the control section 314 and additionally includes an article recognition section 523.

The article recognition section 523 may be a sensor such as a gate sensor, a CCD sensor array, a C-MOS sensor array, a color sensor, or camera. Feature information, such as size, shape, color, and the like of each article without barcode is previously registered in the article database 506 independently of article information of the article database 6.

Next, operation of the self-checkout system according to the present embodiment will be described.

Figure 15:
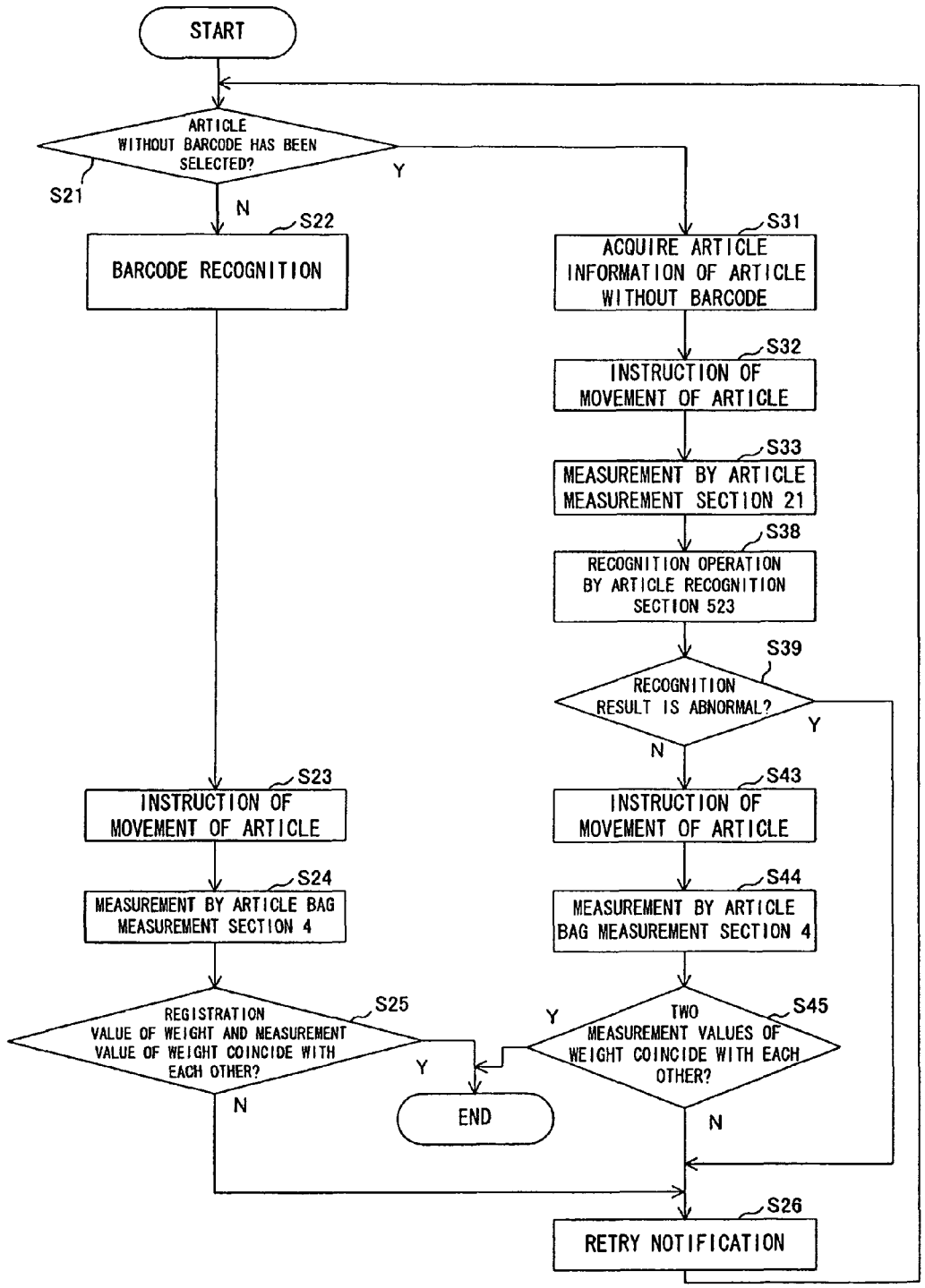
FIG. 15 is a flowchart showing an example of article information acquisition processing performed in the self-checkout system according to the third embodiment.

The operation of the self-checkout system according to the present embodiment is the same as that shown in FIG. 2 except for the article information acquisition processing. FIG. 15 is a flowchart showing an example of the article information acquisition processing performed in the self-checkout system according to the third embodiment. In FIG. 15, the same reference numerals as those in FIG. 3 denote the same or corresponding parts as those in FIG. 3, and the descriptions thereof will be omitted here. In FIG. 15, as compared with FIG. 3, step S38 is executed in place of step S34 and step S39 is executed in place of step S35.

After step S33, the control section 514 causes the article recognition section 523 to perform recognition operation of the feature of an article (S38). Then, the control section 514 determines whether the recognition result is abnormal or not (S39). The case where the recognition result is abnormal means a case where the feature of the article acquired from the article recognition section 523 does not coincide with the feature of the article that has been acquired from the article database 506 for the article without barcode specified by a user. When the recognition result is abnormal (Y in S39), the flow shifts to step S26. On the other hand, when the recognition result is normal (N in S39), the flow advances to step S43.

Figure 16:
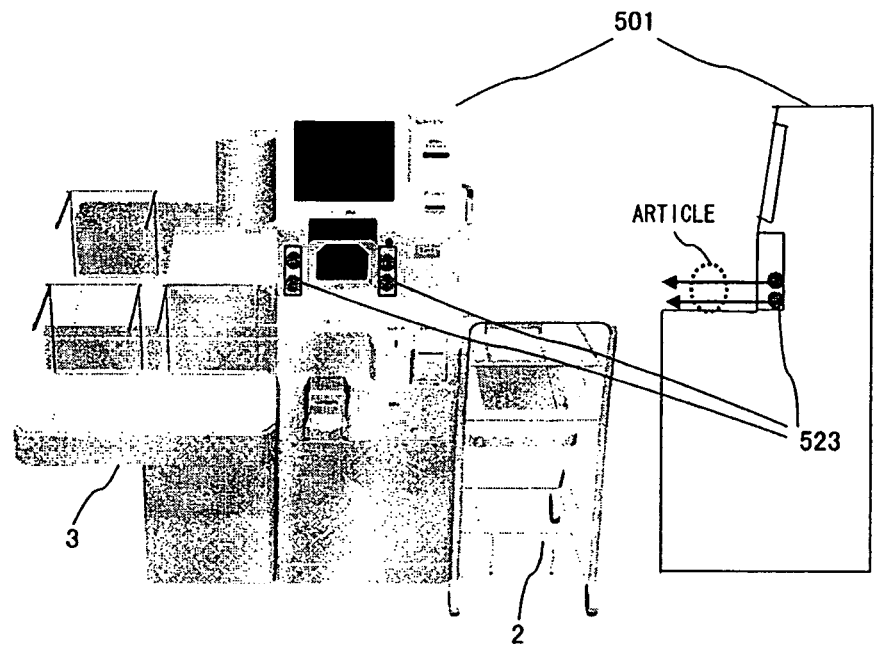
FIG. 16 is an outside view showing an example of the self-checkout system according to the third embodiment.

FIG. 16 is an outside view showing an example of the self-checkout system according to the third embodiment. FIG. 16 shows arrangement of the self-checkout system control unit 501 (including the article recognition section 523), article basket table 2, and article bag station 3. The arrangement of the LCD touch screen 11, barcode scanner 12, and article temporary-placing table 22 is the same as that in FIG. 10.

In the example of FIG. 16, the article recognition section 523 is a gate sensor. When a user performs checkout of an article without barcode, the height of the article is recognized by the gate sensor at the time point when the article is placed on the article temporary-placing table 22. For example, as shown in FIG. 16, the gate sensor is constituted by two vertically arranged light sensors. The upper light sensor detects that the height of the article is, e.g., 50 mm or more and lower light sensor detects that the height of the article is, e.g., 50 mm or less.

In this case, the information concerning the height is previously registered as the feature of each article without barcode in the article database 506. The article recognition section 523 recognizes the height of the article in step S38 and compares the height acquired from the article recognition section 523 and the height acquired from the article database 506 in step S39. When a difference between the two values does not fall within a predetermined range, the recognition result is determined to be abnormal.

Figure 17:
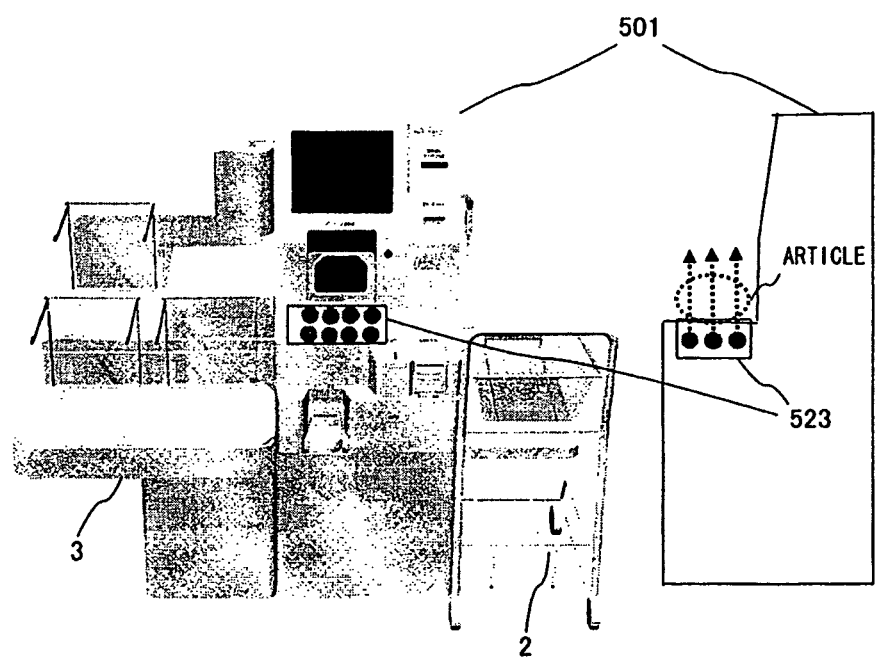
FIG. 17 is an outside view showing another example of the self-checkout system according to the third embodiment.

FIG. 17 is an outside view showing another example of the self-checkout system according to the third embodiment. FIG. 17 shows arrangement of the self-checkout system control unit 501 (including the article recognition section 523), article basket table 2, and article bag station 3. The arrangement of the LCD touch screen 11, barcode scanner 12, and article temporary-placing table 22 is the same as that in FIG. 10.

In the example of FIG. 17, the article recognition section 523 is a CCD sensor array. When a user performs checkout of an article without barcode, the shape of the article is recognized by the CCD array sensor at the time point when the article is placed on the article temporary-placing table 22. For example, as shown in FIG. 17, CCD sensors constituting the CCD sensor array are arranged in a horizontal plane on the article temporary-placing table 22 so as to detect the shape of the article in the horizontal direction.

In this case, the information concerning the shape in the horizontal direction is previously registered as the feature of each article without barcode in the article database 506. The article recognition section 523 recognizes the shape of the article in step S38 and compares the shape acquired from the article recognition section 523 and the shape acquired from the article database 506 in step S39. When a difference between the two shapes does not fall within a predetermined range, the recognition result is determined to be abnormal.

Since the article recognition section 523 is used to perform checkout in the present embodiment, the article measurement section 21 can be omitted. Accordingly, operations of weight measurement in step S33 and weight check in step S45 can be omitted.

Further, in the present embodiment, the feature information of each article without barcode is previously registered in the article database 506 and, only when the article information acquisition processing for the article without barcode is performed, the recognition operation by the article recognition section 523 and check operation of the feature are performed. Alternatively, however, the feature information of articles other than the articles without barcode may previously be registered in the article database 506. In this case, the recognition operation by the article recognition section 523 and check operation of the feature are performed for all articles.

Further, although the article recognition section 523 recognizes the one or two-dimensional size or shape in the present embodiment, the article recognition section 523 may be configured to recognize the three-dimensional size or shape by a use of a plurality of sensors or by moving the article temporary-placing table 22.

According to the present embodiment, by recognizing the feature of the article, such as size, shape, color, and the like, it is possible to prevent improper operation for an article to which a barcode, tag, or the like is not attached.

Further, it is possible to provide a program that allows a computer constituting the checkout system to execute the above steps as a checkout system control program. By storing the above program in a computer-readable storage medium, it is possible to allow the computer constituting the checkout system to execute the program. The computer-readable storage medium mentioned here includes: an internal storage device mounted in a computer, such as ROM or RAM; a portable storage medium such as a CD-ROM, a flexible disk, a DVD disk, a magneto-optical disk, or an IC card; a database that holds computer program; another computer and database thereof; and a transmission medium on a network line.

A first article corresponds to the article with barcode in the embodiments. A second article corresponds to the article without barcode in the embodiments. Further, tag data corresponds to data acquired from the barcode, EAS tag, magnetic tag, or RFID tag in the embodiments.

Further, a first article data acquisition section corresponds to the communication section in the embodiments. A second article data acquisition section corresponds to the communication section in the embodiments. A recognition section corresponds to the barcode scanner or tag reader in the embodiments. A second article specification section and alarm notification section correspond to the LCD touch screen in the embodiments. A determination section corresponds to the control section, article measurement section, and article recognition section in the embodiments. A weight measurement section corresponds to the article measurement section in the embodiments. A size parameter detection section and shape detection section correspond to the article recognition section in the embodiments.

Further, a second article specification step corresponds to step S31 in the embodiments. A recognition step corresponds to step S34 in the embodiments. A determination step corresponds to steps S34, S35, S36, S37, S38, and S39 in the embodiments. A first-article data acquisition step corresponds to steps S34 and S36 in the embodiments. A second article data acquisition step corresponds to step S39 in the embodiments. An alarm notification step corresponds to step S26 in the embodiments.

Industrial Applicability

As described above, the present invention recognizes that an article for which checkout operation is to be performed differs from an article that has falsely been specified by a user to thereby prevent the improper operation. This increases the reliability of the checkout system and leads to the prevalence of the checkout system.

The invention claimed is:

1. A checkout system for performing checkout of articles, comprising:
an article specification section that receives an instruction from a user, the instruction specifying a second article different from a first article having data on the article registered as first article data;
a recognition section that recognizes a presented article which is the first article presented when the presented article is specified as an article without barcode by the user; and
a determination section that determines whether the presented article specified as the second article by the article specification section is not the second article.

2. The checkout system according to claim 1, further comprising:
a first article data acquisition section that acquires first article data of the first article recognized by the recognition section, wherein
the determination section uses the first article data acquired by the first article data acquisition section to determine that the presented article is not the second article.

3. The checkout system according to claim 2, wherein
the first article data includes tag data of a tag attached to the first article, and
the recognition section includes a tag reader for reading the tag data of the tag attached to the article presented so as to recognize the presented article.

4. The checkout system according to claim 1, wherein
the recognition section includes a barcode scanner and performs recognition operation using the barcode scanner for the presented article when the presented article is specified as an article without barcode by the user.

5. The checkout system according to claim 2, wherein
the first article data includes the weight of the first article, and
the determination section includes a weight measurement section that measures the weight of the article presented.

6. The checkout system according to claim 1, comprising
a second article data acquisition section that acquires second article data of the second article, wherein
the determination section uses the second article data acquired by the second article data acquisition section to determine that the presented article is not the second article.

7. The checkout system according to claim 6, wherein
the second article data includes a parameter concerning the size of an article, and
the determination section includes a size parameter detection section that detects the parameter concerning the size of the article presented.

8. The checkout system according to claim 6, wherein
the second article data includes the shape of an article, and
the determination section includes a shape detection section that detects the shape of the article presented.

9. The checkout system according to claim 1, wherein
in the case where it is determined by the determination section that the article presented is not the second article, the operation state is set back to the state before an article is specified as the second article by the article specification section.

10. The checkout system according to claim 1, further comprising:
an alarm notification section that issues an alarm notification when the determination section determines that the article represented is not the second article.

11. A computer-readable medium having recorded thereon a checkout system control program that causes a computer to execute a process comprising:
receiving an instruction from a user, the instruction specifying a second article different from a first article having data on the article registered as first article data;
recognizes recognizing a presented article which is the first article presented when the presented article is specified as an article without barcode by the user; and
determining whether the presented article specified as the second article in the receiving is not the second article.

12. The computer-readable medium according to claim 11, wherein the process further comprises, between the recognizing and the determining, acquiring first article data of the first article recognized in the recognizing, and
the determining uses the first article data acquired in the acquiring to determine that the presented article is not the second article.

13. The computer-readable medium according to claim 12, wherein
the first article data includes tag data of a tag attached to the first article, and
the recognizing includes reading the tag data of the tag attached to the article presented by utilizing a tag reader so as to recognize the presented article.

14. The computer-readable medium according to claim 11, wherein
the recognizing performs recognition operation utilizing a barcode scanner for the presented article when the presented article is specified as an article without barcode by the user.

15. The computer-readable medium according to claim 12, wherein
the first article data includes the weight of the first article, and
the determining includes measuring the weight of the article presented.

16. The computer-readable medium according to claim 11, wherein the process further comprises, between the recognizing and the determining, acquiring second article data of the second article, and
the determining uses the second article data acquired in the acquiring second article data to determine that the presented article is not the second article.

17. The computer-readable medium according to claim 11, wherein the process further comprises, after the determining, issuing an alarm notification when the determining determines that the article represented is not the second article.

18. A checkout system control method that performs checkout of articles, comprising:

receiving an instruction from a user, the instruction specifying a second article different from a first article having data on the article registered as first article data;

recognizing a presented article which is the first article presented when the presented article is specified as an article without barcode by the user; and determines determining whether the presented article specified as the second article in the receiving is not the second article.

19. The checkout system control method according to claim 18, further comprising:

acquiring, between the recognizing and the determining, first article data of the first article recognized in the recognizing, wherein the determining uses the first article data acquired in the acquiring to determine that the presented article is not the second article.

20. The checkout system control method according to claim 18, further comprising:

acquiring, between the recognizing and the determining, second article data of the second article, wherein the determining uses the second article data acquired in the acquiring second article data to determine that the presented article is not the second article.

* * * * *